(12) United States Patent
Peng

(10) Patent No.: US 8,583,959 B2
(45) Date of Patent: Nov. 12, 2013

(54) SYSTEM AND METHOD FOR RECOVERING DATA OF COMPLEMENTARY METAL-OXIDE SEMICONDUCTOR

(75) Inventor: Shuang Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 305 days.

(21) Appl. No.: 13/217,252

(22) Filed: Aug. 25, 2011

(65) Prior Publication Data

US 2012/0166784 A1 Jun. 28, 2012

(30) Foreign Application Priority Data

Dec. 24, 2010 (CN) .......................... 2010 1 0604470

(51) Int. Cl.
*G06F 9/00* (2006.01)
*G06F 11/00* (2006.01)
*G06F 15/177* (2006.01)

(52) U.S. Cl.
USPC ................. 714/6.1; 713/1; 707/609; 707/674

(58) Field of Classification Search
USPC ...................... 713/1, 2; 714/6.1; 707/609, 674
See application file for complete search history.

(56) References Cited

U.S. PATENT DOCUMENTS

2010/0082957 A1* 4/2010 Iwata .............................. 713/1
2013/0138933 A1* 5/2013 Wang .............................. 713/1

OTHER PUBLICATIONS

Control Panel Icons: Take your PC back to an earlier Date with System Restore, Jul. 18, 2006, http://web.archive.org/web/20060718135915/http://www.homeandlearn.co.uk/BC/bcs4p14.html.*

* cited by examiner

*Primary Examiner* — Mark Connolly
(74) *Attorney, Agent, or Firm* — Altis & Wispro Law Group, Inc.

(57) ABSTRACT

Parameters of a complementary metal-oxide semiconductor (CMOS) and an associated system time of a server are stored in a field-replaceable unit (FRU) of a baseboard management controller (BMC) of the server. If an error occurs and the CMOS is selected recovering from the BMC, the system time is selected from the FRU. The BMC reads the parameters from the FRU corresponding to the selected system time and sets the CMOS according to the read parameters.

9 Claims, 3 Drawing Sheets

SYSTEM AND METHOD FOR RECOVERING DATA OF COMPLEMENTARY METAL-OXIDE SEMICONDUCTOR

BACKGROUND

1. Technical Field

Embodiments of the present disclosure generally relate to complementary metal-oxide semiconductor (CMOS) management, and more particularly to a system and method for recovering data of a CMOS.

2. Description of Related Art

If improper parameters are applied to a complementary metal-oxide semiconductor (CMOS), a computer may not boot successfully. As a result, the CMOS has to be cleared and all parameters of the CMOS needs to be reset. It can be very time consuming.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
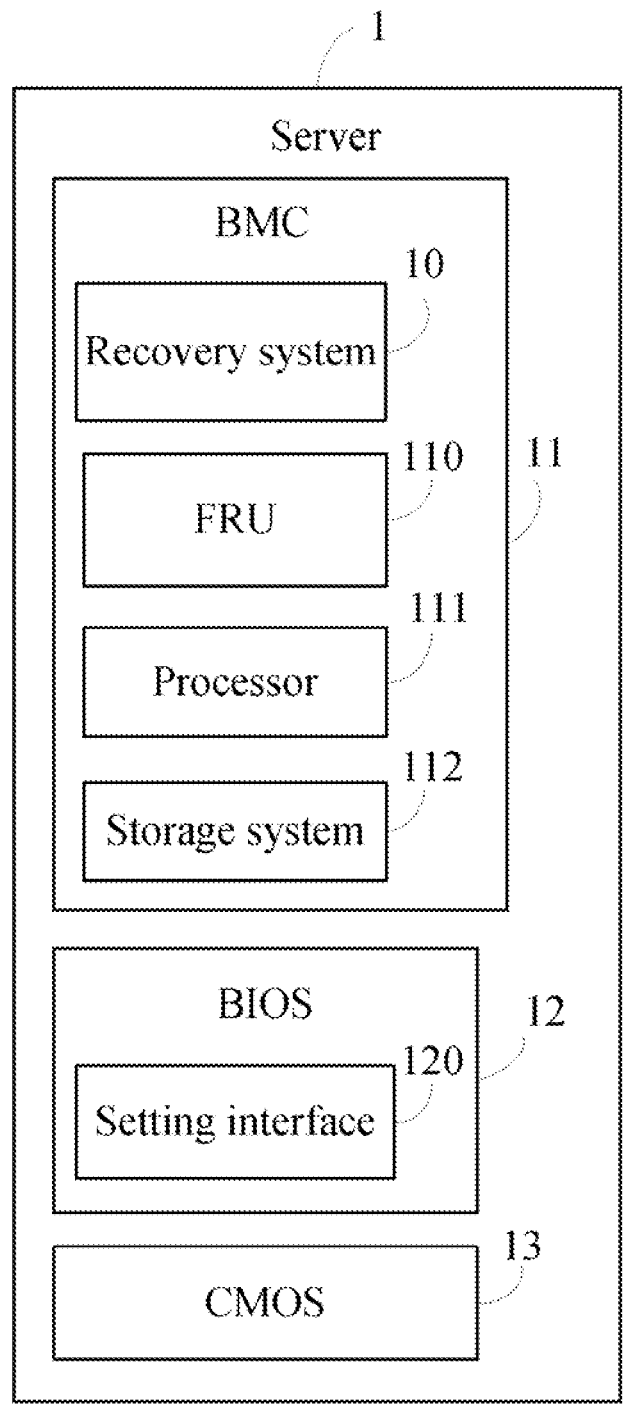
FIG. 1 is a block diagram of one embodiment of a server.

FIG. 1 is a block diagram of one embodiment of a server 1. The server 1 includes a baseboard management controller (BMC) 11, a basic input output system (BIOS) 12, and a complementary metal-oxide semiconductor (CMOS) 13. The BMC 11 includes a recovery system 10 and a field-replaceable unit (FRU) 110. The BIOS 12 provides a setting interface 120. A user may input parameters of the CMOS 13 through display of the setting interface 120 on a display (not shown) of the server 1. The parameters are stored in the FRU 110 and are associated with a system time of the server 1 when the parameters are stored. If the server 1 cannot be booted successfully, the recovery system 10 reads the parameters of the CMOS 13 associated with the system time from the FRU 110 to the CMOS 13.

In an exemplary embodiment, the BMC 10 includes at least one processor 111 and a storage system 112. The recovery system 10 may include one or more modules. The one or more modules may comprise computerized code in the form of one or more programs that are stored in the storage system 112 (or memory). The computerized code includes instructions that are executed by the at least one processor 111 to provide functions for the one or more modules.

Figure 2:
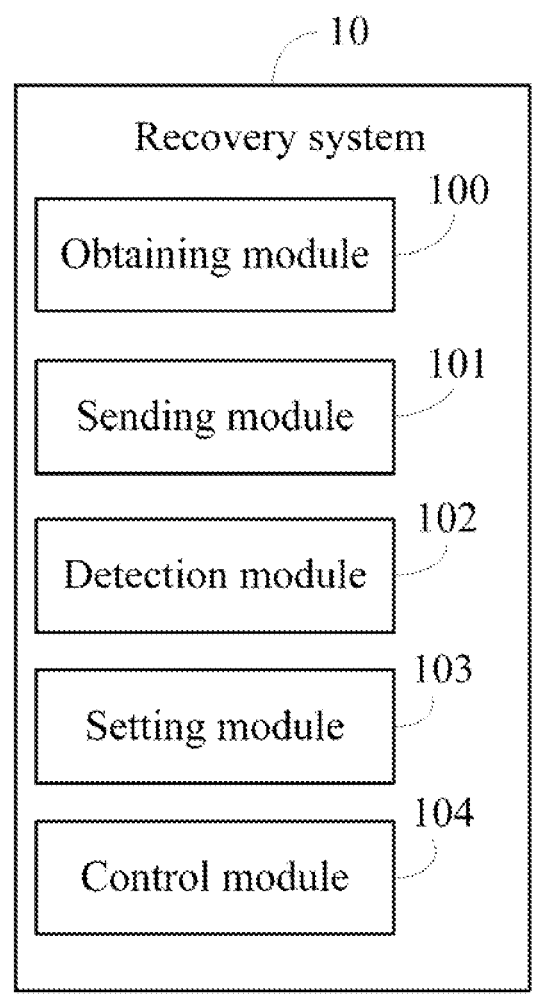
FIG. 2 is a block diagram of one embodiment of the function modules of a recovery system in FIG. 1.

As shown in FIG. 2, the recovery system 10 may include an obtaining module 100, a sending module 101, a detection module 102, a setting module 103, and a control module 104.

If the setting interface 120 provided by the BIOS 12 is activated, the obtaining module 100 obtains parameters of the CMOS 13 set by the user and the associated system time of the server 1. In one embodiment, when the server 1 has been started, the setting interface 120 is activated. The parameters may include supervisor password, user password, boot sequence, for example.

The sending module 101 sends a storage command to the BMC 11 to control the BMC 11 to store the parameters of the CMOS 13 and the associated system time of the server 1 in the FRU 110. It is understood that, when the user resets parameters of the CMOS 13, the parameters of the CMOS 13 and the system time of setting the parameters are stored into the FRU 110. Therefore, in the FRU 110, there are a plurality of records for parameters and associated system times. For example, each record may be a file folder named by a system time.

The detection module 102 detects a selection of recovering the CMOS 13 from the BMC 11. If the user selects to recover the CMOS 13 from the BMC 11, the obtaining module 100 provides an interface on the display that allows user-selection of a specific system time from all stored system times associated with the parameters of the CMOS 13 from the FRU 110. The sending module 101 sends a reading command to the BMC 11. The BMC 11 reads the parameters corresponding to the selected system time from the FRU 110 according to the reading command.

The setting module 103 sets the CMOS 13 according to the read parameters. The control module 104 controls the server 1 to reboot according to the set CMOS 13.

Figure 3:
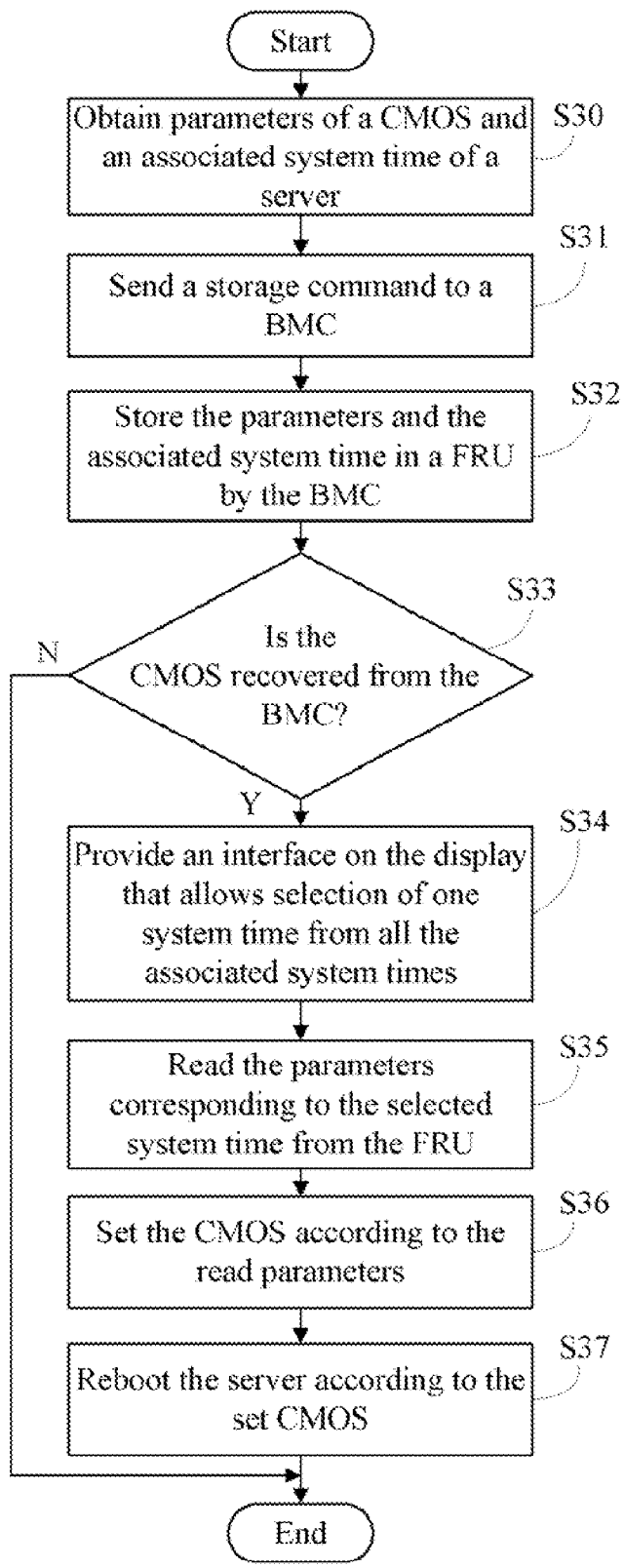
FIG. 3 is a flowchart illustrating one embodiment of a method for recovering data of a CMOS.

FIG. 3 is a flowchart illustrating a method for recovering data of a CMOS. Depending on the embodiment, additional blocks may be added, others removed, and the ordering of the blocks may be changed.

In block S30, if the setting interface 120 provided by the BIOS 12 is activated, the obtaining module 100 obtains parameters of the CMOS 13 set by the user, and obtains the associated system time of the server 1.] The parameters correspond to the associated system time.

In block S31, the sending module 101 sends a storage command to the BMC 11.

In block S32, the BMC 11 stores the parameters and the associated system time to the FRU 110 according to the storage command.

In block S33, the detection module 102 detects a selection of recovering the CMOS 13 from the BMC 11. If the user selects to recover the CMOS 13 from the BMC 11, block S33 is implemented. If the user does not select to recover the CMOS 13 from the BMC 11, procedure ends.

In block S34, the obtaining module 100 can provide an interface on the display that allows selection of one system time from all associated system times from the FRU 110. In one example, a user can use the user interface and select a specific system time from all of the associated system times.

In block S35, the sending module 101 sends a reading command to the BMC 11 to inform the BMC 11 to read the parameters corresponding to the selected system time from the FRU 110.

In block S36, the setting module 103 sets the CMOS 13 according to the read parameters.

In block S37, the control module 104 controls the server 1 to reboot according to the set CMOS 13.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A baseboard management controller (BMC) of a server, comprising:
    a storage system;
    at least one processor; and
    one or more programs being stored in the storage system and executable by the at least one processor, the one or more programs comprising:
    an obtaining module operable to obtain parameters of a complementary metal-oxide semiconductor (CMOS) of the server and an associated system time of the server if a setting interface provided by a basic input output system (BIOS) of the server is activated;
    a sending module operable to send a storage command to the BMC to inform the BMC to store the parameters in the BMC;
    the sending module further operable to send a reading command to the BMC to read the parameters corresponding to a selected system time from the BMC if the CMOS is selected to be recovered from the BMC;
    a setting module operable to set the CMOS according to the read parameters; and
    a control module operable to control the server to reboot according to the set CMOS.

2. The BMC as described in claim 1, wherein the obtaining module is further operable to provide an interface that allows user-selection of a system time from all associated system times from the BMC.

3. The BMC as described in claim 1, wherein the BMC stores the parameters and the associated system time in a field-replaceable unit (FRU) of the BMC.

4. A method for recovering data of a CMOS, comprising:
    obtaining parameters of the CMOS of a server and an associated system time of the server if a setting interface provided by a basic input output system (BIOS) of the server is activated;
    sending a storage command to the BMC to inform the BMC to store the parameters in the BMC;
    sending a reading command to the BMC to read the parameters corresponding to a selected system time from the BMC if the CMOS is selected to be recovered from the BMC;
    setting the CMOS according to the read parameters; and
    controlling the server to reboot according to the set CMOS.

5. The method as described in claim 4, after block sending a storage command to the BMC to inform the BMC to store the parameters further comprising: providing an interface that allows user-selection of a system time from all associated system times from the BMC.

6. The method as described in claim 4, further comprising: storing the parameters and the associated system time in a field-replaceable unit (FRU) of the BMC by the BMC.

7. A non-transitory storage medium having stored thereon instructions that, when executed by a processor, cause the processor to perform a method for recovering data of a CMOS, the method comprising:
    obtaining parameters of the CMOS of a server and an associated system time of the server if a setting interface provided by a basic input output system (BIOS) of the server is activated;
    sending a storage command to the BMC to inform the BMC to store the parameters in the BMC;
    sending a reading command to the BMC to read the parameters corresponding to a selected system time from the BMC if the CMOS is selected to be recovered from the BMC;
    setting the CMOS according to the read parameters; and
    controlling the server to reboot according to the set CMOS.

8. The non-transitory storage medium as described in claim 7, after block sending a storage command to the BMC to inform the BMC to store the parameters further comprising: providing an interface that allows user-selection of a system time from all associated system times from the BMC.

9. The non-transitory storage medium as described in claim 7, further comprising: storing the parameters and the associated system time in a field-replaceable unit (FRU) of the BMC by the BMC.

* * * * *